May 26, 1964 — S. CIRAMI — 3,134,453
WALKING-FIGURE AMUSEMENT LAND VEHICLE
Filed Sept. 19, 1961 — 6 Sheets-Sheet 1

INVENTOR.
Salvatore Cirami

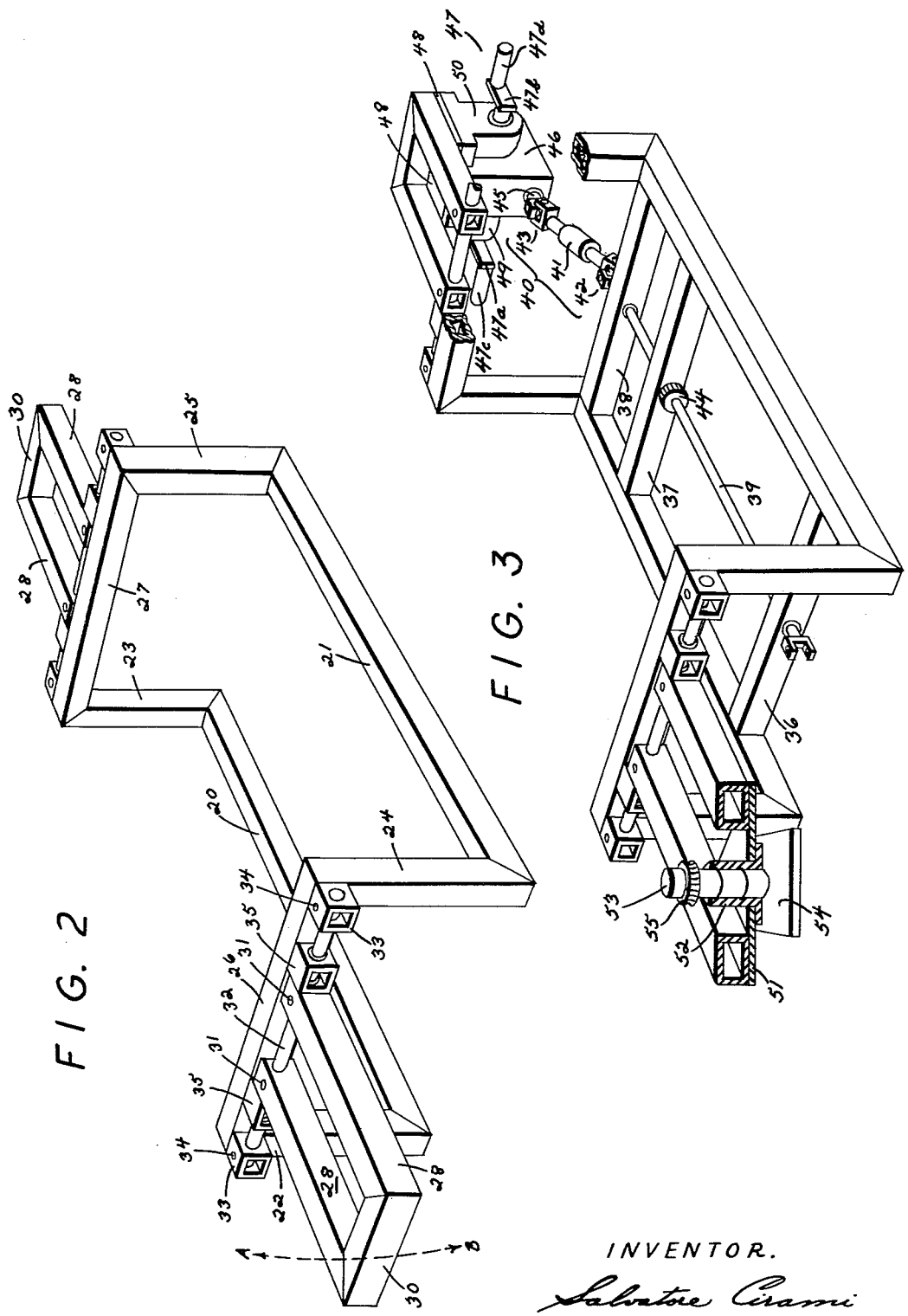

May 26, 1964 S. CIRAMI 3,134,453
WALKING—FIGURE AMUSEMENT LAND VEHICLE
Filed Sept. 19, 1961 6 Sheets—Sheet 3

INVENTOR.
Salvatore Cirami

INVENTOR.
Salvatore Cirami

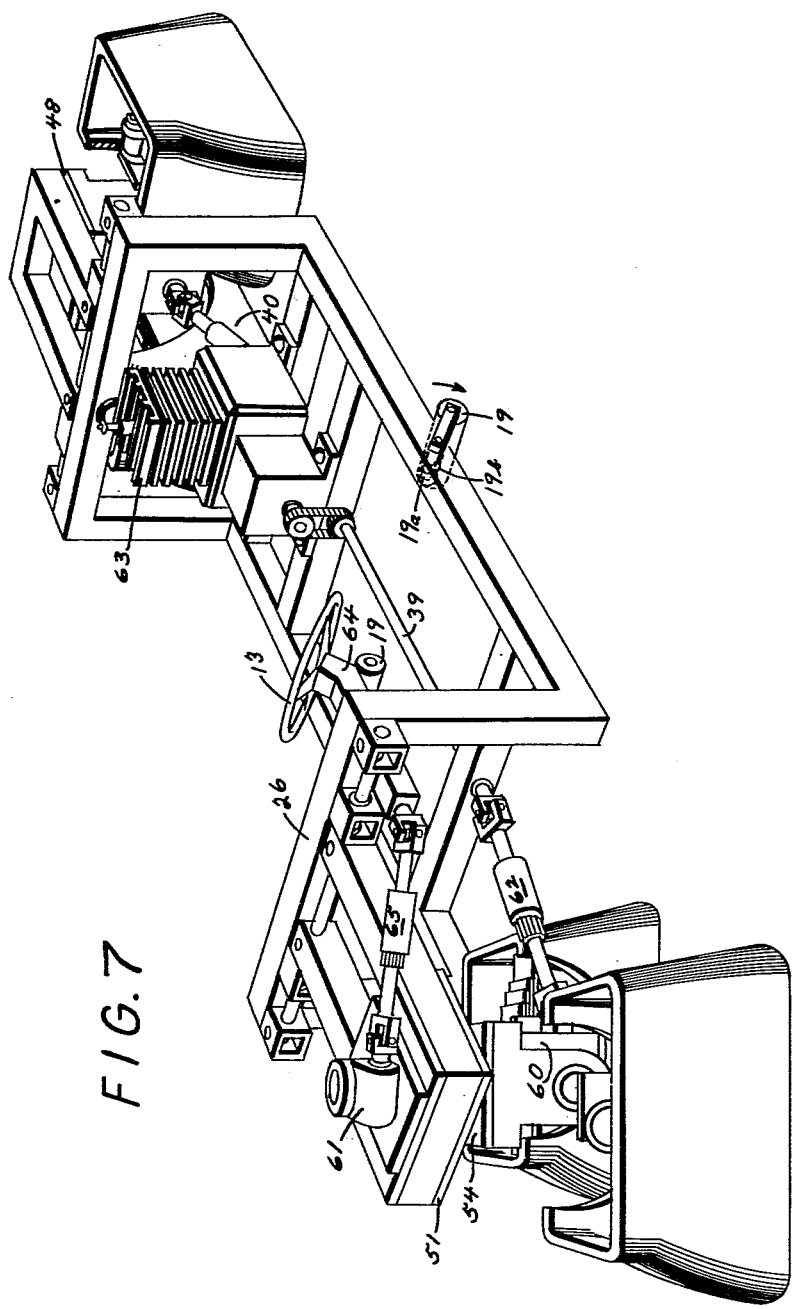

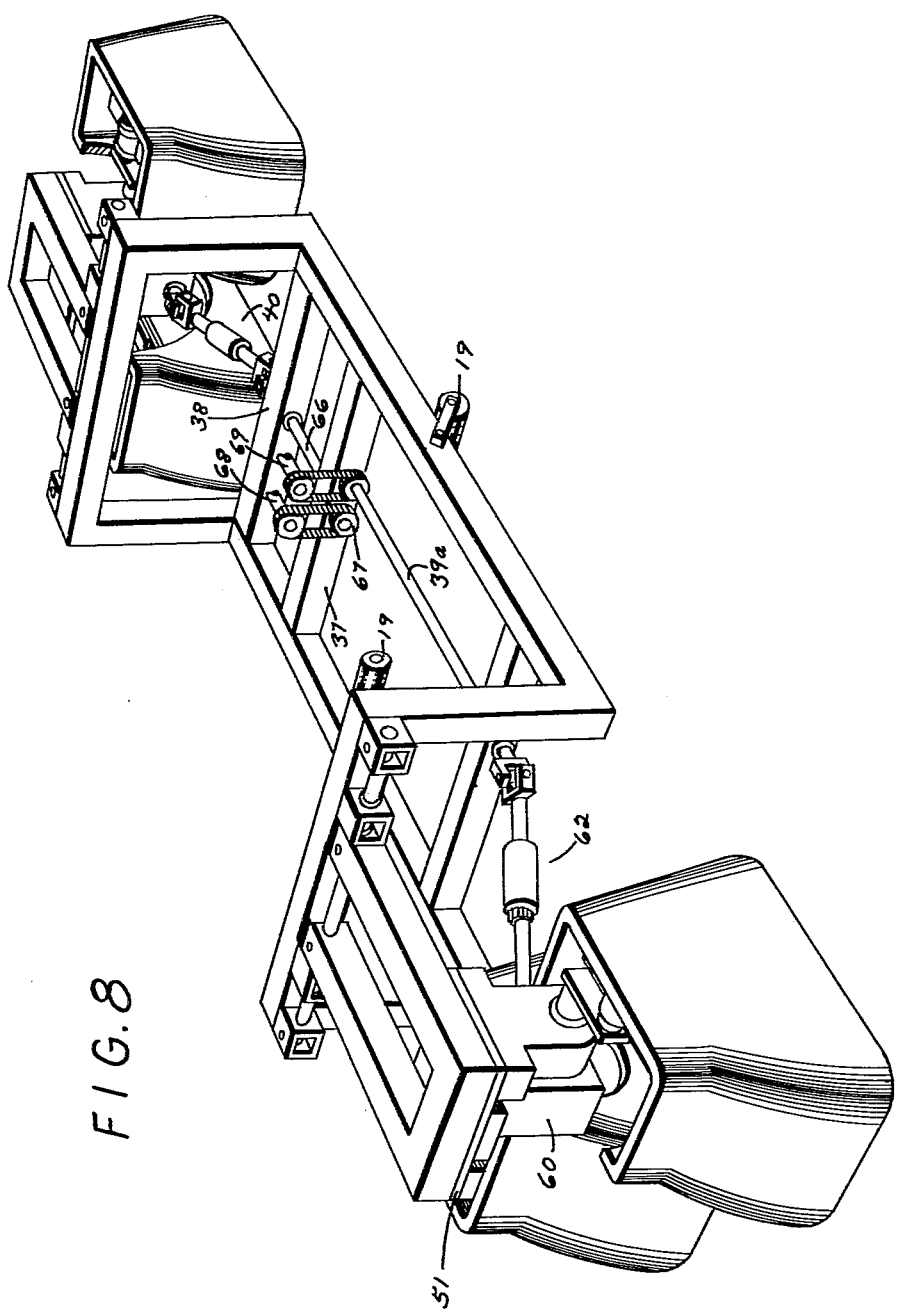

| United States Patent Office | 3,134,453
Patented May 26, 1964 |
|---|---|

3,134,453
WALKING-FIGURE AMUSEMENT LAND VEHICLE
Salvatore Cirami, 75—36 Parsons Blvd., Flushing, N.Y.
Filed Sept. 19, 1961, Ser. No. 139,250
9 Claims. (Cl. 180—8)

This invention is an amusement ride device based on a vehicle with a body in the shape of an animal figure and propelled only by four mechanized feet. A passenger compartment, with seating capacity for from four to six persons, is provided in the torso of the figure—in this embodiment a dinosaur—as well as a concealed motor to power the feet. The structure is a complete, independent ride device that can be directed anywhere, either by means of a steering wheel connected to steerable front feet, or, in an embodiment in which neither pair of feet is steerable, by causing the feet to step in opposite directions.

The basic objective is to provide a class of passenger compartmented walking-figure amusement land vehicles wherein the passenger compartment is carried not more than a few inches off the ground, and is located between a single pair of feet located forward and another single pair of feet located rearward of the said passenger compartment.

Specifically, it is an object to provide a vehicle of the above class with a body in the form of a figure having a horizontally elongated torso (like a dog, cat), and to provide this figure in combination with mechanized feet simulating the feet of the natural animal. Other parts of this object are to provide a passenger compartment with seats for four to six persons, and to include a motor—concealed in the torso—and connected to operate the feet. Still another part of this object is to provide a steering wheel connected to a steerable pair of feet to allow the driver to "walk" the vehicle anywhere he chooses. Because of the funny walking movements and the animal shape, the vehicle provides a novel ride and affords onlookers an unusual, entertaining sight.

A special object is to provide the above vehicle with a pair of rollers under the torso, to remove some of the burden from the walking feet, and, to increase the operating efficiency of the vehicle.

Still another object is to provide a variant of the above vehicle, in which neither the forward nor the rearward pairs of feet is steerable. Instead, steering is accomplished by control of the stepping direction of the feet. In this alternative embodiment, the conditions are made that the feet are coordinated in movement such that when the left front foot is in the fully advanced position, the right rear foot will also be in the fully advanced position; and the walking mechanism that operates the feet in each pair is designed to alternately lift, advance, lower and return the feet in each pair; and further that the forward pair of feet can be made to step forward at the same time that the rearward pair of feet is made to step backward, or, the forward pair of feet can be made to step backward at the same time that the rearward pair of feet is made to step forward. By this combination, the vehicle is made to pivot either left or right. A part of this object is to provide a second form of vehicle having rollers to assist in the steering action—by carrying part of the load and providing a pivot point around which the vehicle turns, and by controlling the tendency of the vehicle to tip from one side to the other.

A particularly important object is to provide a walking-figure vehicle in which the passenger compartment is carried slung low between the forward and rearward feet, for accessibility, stability, and to facilitate use of the rollers. This is accomplished by "dropping" the central base portion of the chassis frame between elevated chassis extension members and arranging the feet to depend from the chassis extension members. It is a part of this object to provide a yielding point of connection between the chassis extension members and the base portion of the chassis frame. The flexibly mounted extension members afford some resiliency between the attached walking feet and the part of the chassis that carries the passengers.

Another object is to provide an improved foot member for the vehicle's walking mechanism; which, first disclosed in principle in Robot Amusement Ride, Serial No. 768,793 filed October 21, 1958 and now Patent No. 3,093,372, employs as its foot member a hollow open top box in which is arranged a bearing for the retention of a single horizontally disposed shaft that is lifted, advanced, lowered and returned to actuate the foot member. Where formerly the bearing had been rigidly fixed in position inside the box, it is an object of the present disclosure to flexibly connect the bearing to the box, so that under the load assumed when the said shaft is lowered, the bearing will depress, thereby reducing the elevation to which the vehicle is lifted each time the said shaft is lowered.

Another object is to provide a chassis frame comprising a base portion, an upright portion fixed at each end, and a separate chassis extension member pivotally connected to each upright portion at an elevation on same in such arrangement as to effectively extend the overall length of said base portion. It is a part of this object to provide said yielding connection with spring tension means to hold the chassis extension members normally in a level attitude paralleling that of the base portion and so arrange the spring tension means that the chassis extension member is movable—at the extremity furthest from the place of connection on the upright portion—in an upright arc having its center at said pivotal connection; the chassis frame being so constructed and arranged that propulsion means can be attached depending from the chassis extension members, and passengers—carried at a minimal elevation on the base portion—will be buffered against road shock due to the action of the spring tension means. The advantage of this arrangement being that in addition to the described cushioning effect, a means is provided for the propulsion means to partly unburden itself of exceptionally heavy passenger loads: because the base portion can be lowered onto rollers depending from the underside of the base portion; this being possible only because the propulsion means are attached—in effect—at the end of a moment arm, with the suspension system at one end; rather than being attached underneath the chassis, with the suspension system overhead, as is current practice.

FIG. 1 is a perspective view of a completed walking-figure amusement land vehicle with a body in the form of a dinosaur.

FIGS. 2 through 5 reveal—in related perspective views drawn to the same scale—the chassis and attached mechanical elements concealed by the torso of the dinosaur. Each drawing represents the chassis as it would appear in successively more advanced phases of assembly.

FIG. 2 isolates the basic chassis structure of the vehicle, showing it as it would appear before any of the cooperating elements have been installed.

FIG. 3 shows this same chassis again, but this time with some of these elements attached. The chassis structure is shown partly in section at the front, and partly broken away at the rear to show most clearly the relationship of these additional parts.

FIG. 7 shows the assembly in the final stage, with installation of all the necessary parts complete; awaiting only the attachment of a body shell, such as the dinosaur figure illustrated in FIG. 1.

Figure 1:
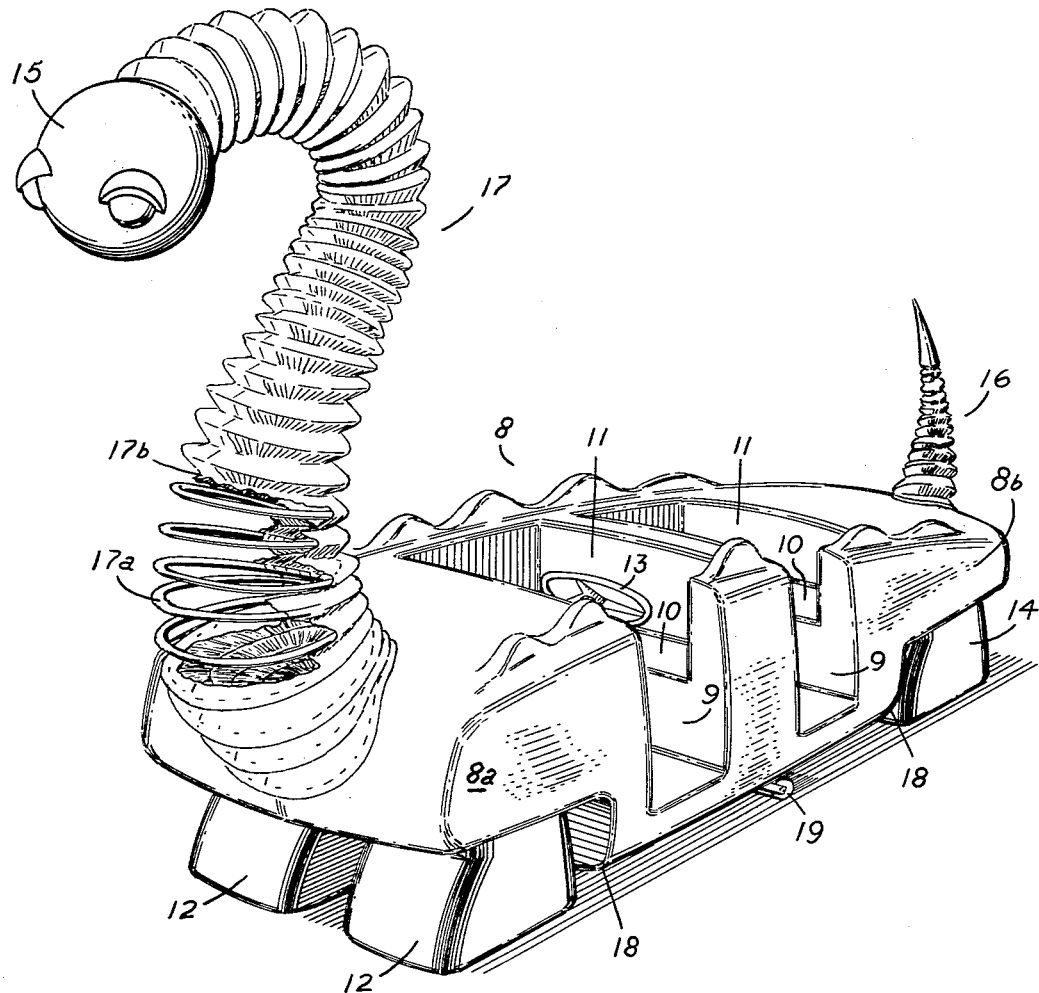

In FIG. 8 the basic chassis structure is shown again, and some of the elements used before are also shown installed; but in this drawing the specifics have been altered to achieve a new cooperative relation between these elements. The result is a second embodiment of a walking land vehicle, that achieves the same essential functions as the first, but in an importantly different way. These changes do not affect the body attachment, and either version of chassis assembly may be used to propel the figure.

This invention embraces a ride that uses a number of walking cars operating independently of each other, but within the confines of a fenced-in area. Landscaping and backdrops appropriate to the theme of the figure could be used to create an attention attracting environment.

At the start of the ride passengers get into the torso 8 through easily accessible side entranceways 9 and seat themselves 10 in the passenger compartments 11. A steerable forward pair of feet 12 is turnable by the steering wheel 13. The read end of the torso is carried by a duplicate, but not steerably connected pair of feet 14. The torso has an enclosed forward section 8a, and an enclosed rearward section 8b, to conceal the walking mechanism of the feet. Note that the passenger compartments are located down low, between these forward and rearward enclosed sections. The bottoms of these sections are cut away, of course, to allow the feet to depend down to the ground; and a portion of the front and side walls of the forward section, and a portion of the sides and rear wall of the rearward section is cut away to reveal the feet so that their operation may be observed by onlookers.

To complete the figure a head 15 and a tail 16 are attached. The deliberate displacement given the torso by the walking feet is utilized by the long, arched neck 17 and the tail. These elements of the figure are made of coiled spring steel 17a and covered with rubberized canvas 17b, sewn on and folded between the coils in an accordion-pleat arrangement. When a number of these vehicles are seen walking around each other, the swaying necks and bobbing tails makes them seem almost alive and enhances the desired illusion.

Because the feet in each pair are lifted alternately and the feet of the forward and rearward pairs are coordinated in movement relative to each other (such that when the left front foot is in the fully advanced position, the right rear foot will also be in the fully advanced position, and vice versa) the tendency of the car to fall to one side will be offset by a similar condition influencing it to the other side. But, this will not always be the case because the people sitting on one side may be heavier than those on the other. When this happens the vehicle would drag on the corners 18. If these places are shielded with smooth steel plates, this result is not undesirable. Since the torso is mounted very low to the ground (four to twelve inches clearance) the list would not be severe and would even heighten the excitement. The point is that the vehicle will walk on only its own four feet, without the assistance of wheels or any other means to provide balance.

But I prefer to put a roller 19 on both sides, on the underside of the torso, midway between the forward and rearward feet. These rollers serve to lengthen the operating life of the walking mechanisms by supporting some of the weight, allow the use of a less powerful motor than is necessary when the vehicle must drag itself on its corners, and generally increase the longevity of the vehicle by reducing the twisting strains that would be put upon the chassis and mechanism of a drag-type vehicle. These rollers may be rigidly mounted and be in continuous contact with the ground; be rigidly mounted and held off the ground slightly—to permit some sidewise tipping; or be in continuous contact with the ground but be yieldingly mounted—to achieve a gradual sidewise rocking motion as the vehicle walks along.

When connected in this last, preferred way, the rollers smoothen the walking movements, help to impart a pleasant sensation of walking to passengers, and contribute to the illusion created for the benefit of onlookers. In FIG. 7, dashed lines indicate the portion of the roller that extends under the frame, the shaft 19a and the coiled spring 19b that forces the roller in the direction of the arrow. These elements are shown installed in the frame member, for maximum clearance.

The chassis frame comprises two spaced apart parallel longitudinal members 20, 21, FIG. 2; uprights 22, 23, 24 and 25, located one at each end of each longitudinal member; a main cross-member 26 rigidly joining uprights 22, 24; and another main cross-member 27 joining uprights 23, 25.

The chassis extension members are each made up of longitudinal pieces 28 rigidly held by a cross piece 30 at one end, and fastened by pins 31 onto a torsion bar 32. The torsion bar is supported at its ends and prevented from rotating by torsion bar supports 33 and shear resisting pins 34 fixed in the supports and passing through the torsion bar. The bar is also supported near its center by torsion bar bearings 35 that do permit rotational movement, allowing the flexibility of the bar to effect slight movement of the end of the chassis extension member in the direction (but not to the degree) of the arc A—B. An identical chassis extension member is similarly attached at the rear, to main cross-member 27.

The assembly continues in FIG. 3 with the welding in of secondary cross-members 36, 37, 38 and the installation of a main drive shaft 39. The main drive shaft is fitted with universal joint yokes fore and aft so that it may be connected at both ends to variable-length drive shafts that convey power to the walking mechanism of the feet.

One of these variable-length drive shafts 40 can be seen in this view, where 41 indicates a male-female fitting where a splined insert is free to slide in and out of a correspondingly machined collar, but is prevented from rotational movement relative to the collar by the splines. Like the main drive shaft, this variable-length drive shaft is provided with yokes fore and aft to complete universal joints 42 and 43. A sprocket 44 is fastened to the main drive shaft, close to secondary cross-member 37 for maximum support.

It can be seen that rotating the main drive shaft by means of the sprocket will force rotation of the variable-length drive shaft and in turn, the power input shaft 45 that goes into the gearbox 46 of the rearward feet. Inside this gearbox a worm attached to shaft 45 forces rotation of a gear wheel that operates the main shaft of the crankshaft assembly 47 that is the heart of the walking mechanism. The gearbox is fastened to the rearward fill-in plate 48, which also supports crankshaft assembly bearings 49, 50. The crankshaft assembly 47 is made up of a main shaft (the part journaled in the bearings 49, 50); perpendicular offsets 47a and 47b (attached at each end of the main shaft in opposed throw from each other); and minor shafts 47c, 47d (the small shafts carried by the perpendicular offsets). The perpendicular offsets and the minor shafts are rotated in the clear at the sides of the bearings, and it is on these minor shafts that the feet are hung.

The purpose of the variable-length feature of the drive shaft 40 is to compensate for the movement of the gearbox toward or away from the chassis frame as a result of the flexing of the chassis extension frame on its torsion bar. Another variable-length drive shaft permits the forward pair of feet to steer left or right and still receive power.

Portions of the chassis frame and almost half the rear torsion bar are broken away, and one torsion bar bearing and one torsion bar support are removed in this view, FIG. 3, to afford an unobstructed view of the elements attached to the rearward extension frame.

Returning to the forward end of the chassis, a second fill-in plate 51 is fixed to the underside of the chassis extension frame, and a steering shaft bearing 52 inserted. This bearing holds the steering shaft 53 to which is fixed at one end the forward undercarriage base plate 54, and at the other, a gear 55 milled to mesh with a worm. The fill-in plate is shown cut diagonally to afford a revealing section.

Figure 4:
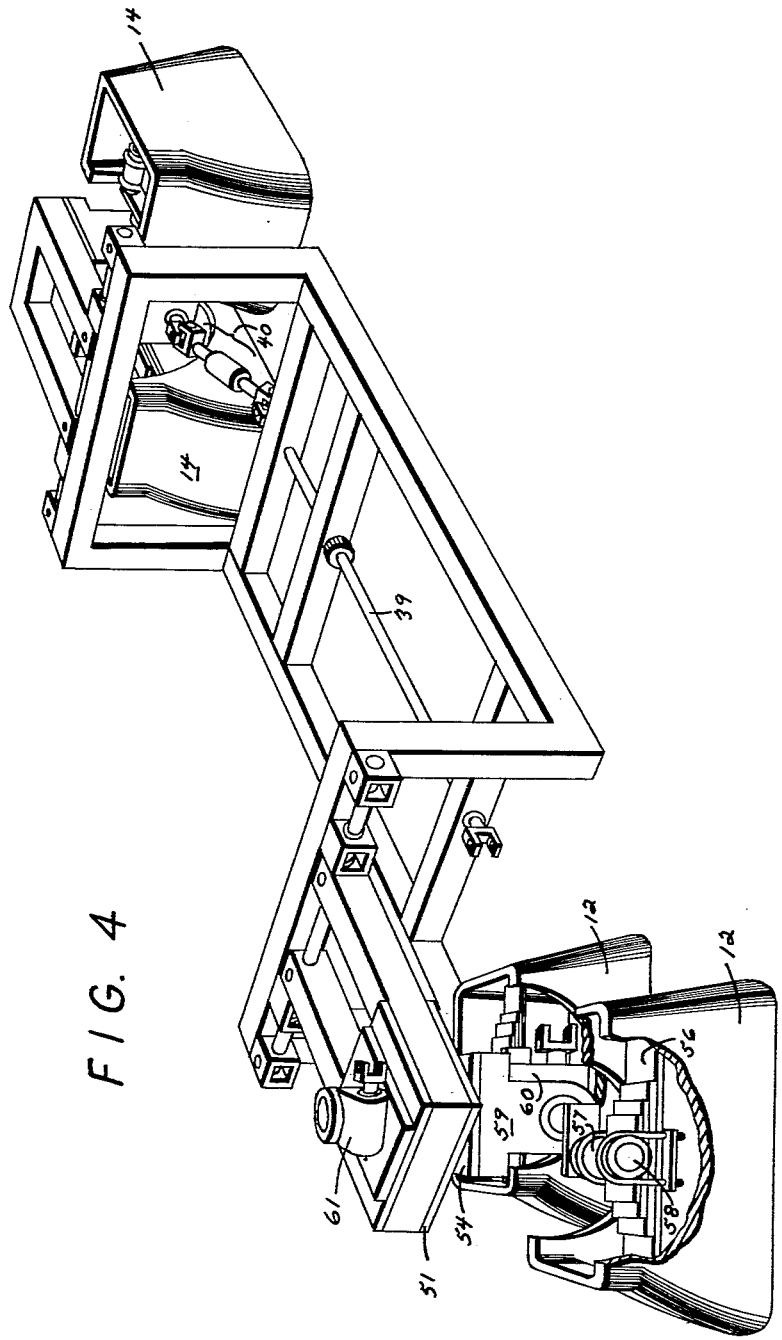
FIG. 4 shows the assembly in an advanced stage. Part of the left front foot is shown broken away to reveal internal structure.

Turning now to FIG. 4, we see the assembly of the rearward walking mechanism completed by installation of feet 14 pivotally hung on the minor shafts of the crankshaft assembly. A similar walking mechanism at the front end depends from the forward undercarriage base plate 54.

Figure 5:
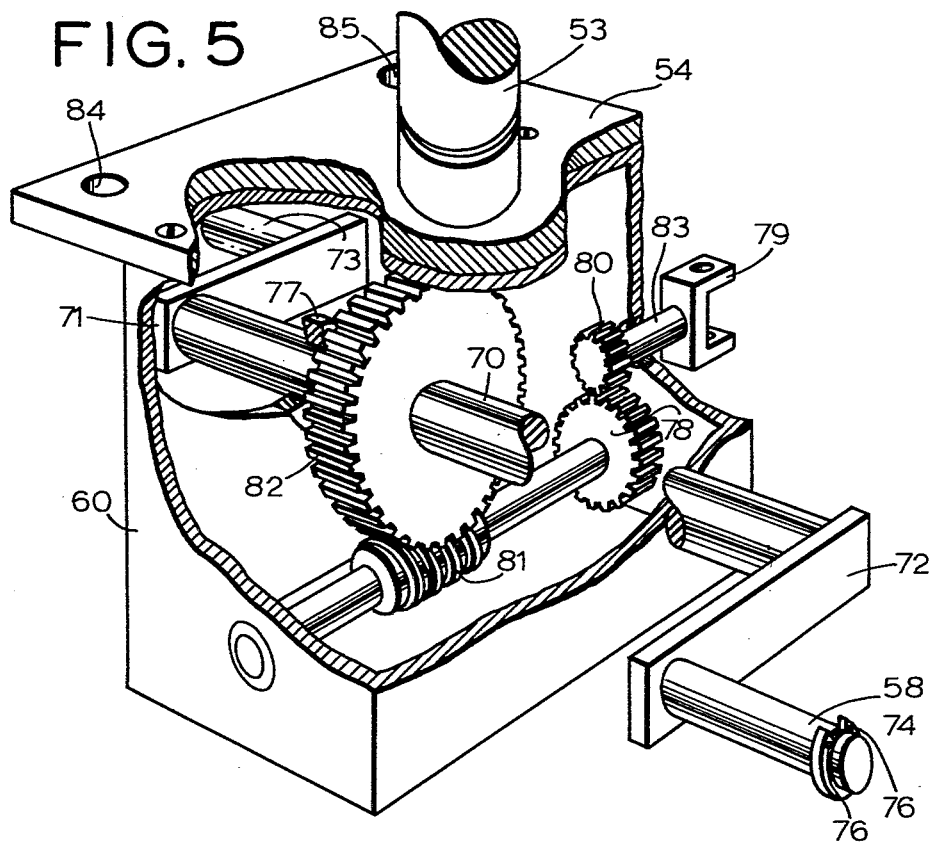
FIG. 5 is an enlarged perspective view of a gearbox and crankshaft used to actuate the foot members of the walking mechanism, with portions of the structure broken away to reveal internal elements.

The outboard wall of the left front foot is broken away to reveal a leaf spring 56 shackled to a shaft retaining means 57 that reecives the minor shaft 58. All the feet are hung in a similar way. In this view, only one of the forward pair of crankshaft assembly bearings can be seen, 59; but it is understood that another one is located on the other side of the gearbox 60. This gearbox is identical to the rear gearbox 46. A steering shaft gearbox 61 covers the gear 55 of FIG. 3, and contains a worm and supporting bearings. Turning to FIG. 5, another variable-length drive shaft 62 connects the main drive shaft 39 with the forward gearbox 60.

Figure 6:
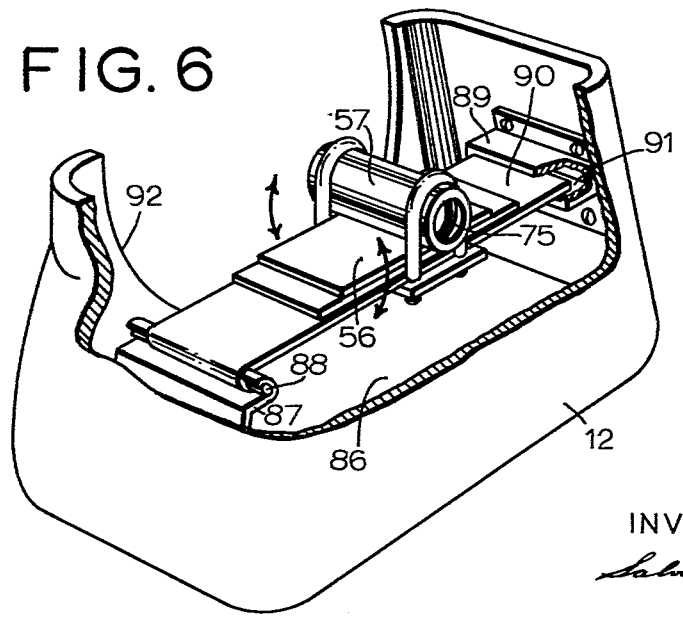
FIG. 6 is a perspective view of one of the foot members driven by the walking mechanism of FIG. 5; partly broken away to afford a view into the interior of the foot member.

The forward gearbox 60 is shown enlarged in FIG. 5. As previously stated, the essential driving element of the walking mechanism is a crankshaft assembly. Though numbered differently to differentiate according to location, the crankshaft assembly of the forward-located walking mechanism is identical to crankshaft assembly 47. The crankshaft assembly comprises a main shaft portion 70 to which is rigidly fixed at each end perpendicular offsets 71, 72. Minor shaft 73 and 58, which are fixed to the offsets, are machined to fit inside a bearing such as 57, located in the foot member 12, FIG. 6. Of course, a separate foot member is provided for each minor shaft, and the foot member shown in FIG. 6 is designed for installation on minor shaft 58 of FIG. 5. The bearing 57 is held on the minor shaft by means of an expansion ring 74, FIG. 5, which fits into the groove 75 cut on the inside of the bearing. The pinholes 76 are used to compress the ring when it is desired to remove the foot member; a special pliers-like tool being used for the purpose.

The main shaft is supported in the gearbox by bearings in the wall of the gearbox. One of the bearings is shown and is numbered 77; the other would be located in the part of the wall broken away and arranged to support the main shaft at the section that has been removed to reveal the gear 78.

In operation, rotation of the illustrated portion of the universal coupling yoke 79 by the variable-length coupling 62 of FIG. 7 drives the gear 80, which, operating through the gear 78 drives a worm 81. The worm drives the worm gear 82 which is locked onto the main shaft 70. In short, the gearbox serves the purpose of reducing the rotational speed of the input shaft 83 to the speed most suitable for lifting, advancing, lowering and returning the foot member 12.

The crankshaft assembly bearing 59, FIG. 4, is secured to the forward undercarriage base plate 54, by means of bolts passing through the bolt holes in the plate; as for example, at 84 and 85, FIG. 5; portions of the plate being shown broken away.

Each foot member comprises a base 86, FIG. 6, to which is fixed completely encircling upright walls. The bearing 57 is supported at an altitude above said base, with the longitudinal axis of the journal aperture in the bearing lying parallel to a horizontal reference surface upon which said foot member is placed. The leaf spring 56 is provided to yieldingly support the bearing at an altitude greater than the longest dimension of the perpendicular offset 72. The leaf spring is supported at one end by the hinge bracket 87 which is provided with a hinge pin 88; and by a slotted bracket 89 into which the end 90 of the leaf spring is inserted with sufficient clearance 91 to permit further entry of the end 90 as a result of the spring's flexing while under load.

The spring is designed extra wide to compensate for any tendency of the bearing to twist the spring as indicated by the arrows, FIG. 6.

One wall of the foot member—that wall that is intended to lie inboard when the foot member is installed on the minor shaft—is provided with a cutout centered around an extension of the longitudinal axis of the journal aperture in the bearing and drawn large enough to afford operating clearance between the said inboard wall and the actuating crankshaft.

The advantage of yieldingly mounting the bearing in the foot member is that instead of the main shaft 70 having to "climb up" to a height equivalent to the throw of the offset 72; as the minor shaft lowers and places an increasing load on the bearing, the spring will depress and reduce the height to which the main shaft and gear box, etc. must be lifted. This affords use of a less powerful motor because less torque need be applied to the main shaft.

An incidental advantage of having the spring is that the foot member is able to absorb some road shock, transferring less of it to the gearing, and affording a more pleasant walking sensation to passengers. But the resiliency of the spring is preferably selected somewhat softer than what would be ideal for a purely shock cushioning function. This is because it is desired that the spring depress as much as possible when it is under normal load; i.e., when the minor shaft is lowered and the vehicle's weight is shifted to that foot member. This is in contrast to a shock cushioning tension; which would be so selected that the spring would flex to its limit only under unusual stress.

The bearing and leaf spring are arranged somewhat to one side of the longitudinal center of the foot member, away from the inboard wall. This is to provide additional room for arrangement in the foot member of the offset end of the crankshaft.

The large crankshaft assembly bearings, such as 49, 50 located rearward in FIG. 3, and 59 in FIG. 4, are arranged on either side of the gearbox and provide support for the main shaft in addition to the support that is provided by the bearings—such as 77—in the wall of the gearbox itself.

The buildup is completed by installation of the motor 63 connected by means of a sprocket and chain to the main drive shaft; attachment of the rollers 19; and inclusion of a steering wheel 13 operating through a gearbox 64 mounted on the forward main cross-member 26 and connected by means of another variable-length drive shaft 65 to the steering shaft gearbox 61. The chassis is now ready to receive the body shell shown in FIG. 1.

This vehicle could be steered without turning either the forward or the rearward feet, and indeed, the turning radius can be reduced, by means of a variation illustrated in FIG. 8.

In this embodiment the forward undercarriage base plate 54 (see FIG. 5) is eliminated, and the walking mechanism is fixed directly to the underside of the fill-in plate 51. The forward pair of feet is not steerable, so the steering apparatus of FIG. 5 is eliminated.

Instead, new elements are introduced: a shortened drive draft 39a terminating in secondary cross-member 37, and an auxiliary drive shaft 66 extending from this side of secondary cross-member 37 to the farside of secondary cross-member 38. A sprocket 67 is attached to one end of the auxiliary drive shaft and the other end is coupled, by means of a universal joint, to the rearward variable-length drive shaft 40.

Just as the main drive shaft 39 of FIG. 4 is connected by means of sprockets and chain to a motor, the shortened drive shaft 39a and the auxiliary drive shaft 66 are connected by means of sprockets and chain to shafts 68 and 69 that are in turn connected—through a special clutch—to the motor (not shown). Shafts 68 and 69 represent the outputs of a clutch having internal mechanism so arranged as to enable the motor to operate the shafts in a variety of directions, at the option of the driver.

The arrangement is such that when shafts 68, 69 are both turned in the same direction, the descending feet (at diagonally opposite corners) will move in the same direction. For example, if the feet are moving rearward (when in contact with the ground) the vehicle will be propelled forward in a straight path. If both shafts are turned in the opposite direction, the feet will move forward and the vehicle will be propelled rearward. But, if shaft 68 is turned clockwise while shaft 69 is turned counter-clockwise, the descending feet will likewise move in opposite directions: if the forward descending foot is moving rearward, the rearward descending foot will be moving forward. Likewise, if the conditions are reversed—if shaft 68 is turned counter-clockwise while shaft 69 is turned clockwise—the forward descending foot would be moving forward, while the rearward descending foot is moving rearward. Since these feet are on opposite sides of the vehicle, the effect is to advance the vehicle on one side while retarding it on the other. The outcome is that the vehicle pivots.

The direction of pivoting, depends on which side the ground-contacting descending feet are located. The steering direction will be reversed the moment the other, alternate, diagonally opposed feet come into play. This effect would be a limitation if this were a practical transportation type vehicle, but here it presents a challenge to drivers, causes them to inadvertently bump other cars, increasing excitement and leading to repeat rides.

The rollers 19 are free to roll in either direction. If the principal weight of the vehicle is supported by these rollers, the descending feet are, in effect, on either side of a circle circumscribed by the movement of these rollers. The vehicle pivots around the center of this circle.

By selecting the rotation situations in the proper sequence, the vehicle can be made to go forward, backward, or make tight turns in a limited space or under conditions of crowding. The means of making this selection will depend on the particular form of clutch (or combination clutch and transmission) used. Well-known devices are applicable here, so the specifics of the clutch need not be spelled out. The equivalent here, of the steering wheel used in the first version, would be a four position (forward, reverse, left, right) electrical switch; or a four position transmission lever and a clutch—depending on whether the gears or other devices used to control the direction of rotation of output shafts 68, 69 were moved electrically or manually.

The shape of the chassis is particularly suitable for a walking figure amusement land vehicle, because passengers can enter and leave through entranceways located to facilitate rapid loading and unloading, with maximum safety. Since any walking mechanism—or at least the one used here—is an inherently tall, space-consuming device, the space provided fore and aft of the chassis frame is ideal for the installation of these machines.

In the claims, the longitudinal members 20, 21 of the chassis, together with their connecting secondary cross-members 36, 37, 38; are referred to as the "base portion" of the chassis frame. The upright members 22, 24 together with the cross-member 26, is referred to simply as a "forward upright portion" of the chassis frame. Similarly, upright members 23, 25 in combination with main cross-member 27, constitutes the "rearward upright portion" of the chassis frame.

Each chassis extension member is yieldingly connected to the upright portion of the chassis frame. Because of this the attached walking mechanism is able to adapt itself to uneven terrain without transmitting undue shock to the passengers. Further, the load placed on the walking mechanism is controllable: if the weight becomes extreme, it can be carried by the rollers under the chassis frame. When a foot is lowered it will assume more and more of the load as its operating crank attempts, in effect, to climb up on the foot. If the chassis extension member were rigidly connected to the chassis frame, the foot would be forced to assume a burden limited only by the capacity of the passenger compartment. But with the connection made flexible, the total pressure placed on the foot can be limited by adjusting the tension of the resilient connection. This yielding point, one: reduces shock to passengers; two: permits the walking mechanism to transfer the burden to rollers under the base portion of the chassis frame; and three: when used with these rollers, and the connection is sufficiently resilient, permits the feet to climb over obstacles without having to lift the chassis frame, because the yielding connection flexes while the main burden is carried by the rollers.

I claim:

1. A walking-figure amusement land vehicle comprising:
   a chassis frame comprising a base portion, a first upright portion secured at a forward end of said base portion, a second upright portion secured at a rearward end of said base portion, a forward chassis extension member secured to said first upright portion, and a rearward chassis extension member secured to said second upright portion; said chassis extension members so arranged on their supporting upright portion as to effectively extend the overall length of said base portion, and attached on the upright portion at an elevation relative to said base portion;
   a forward pair of foot members arranged under the forward chassis extension member and depending below the base portion of the chassis frame;
   power-driven means to alternately lift, advance, lower and return said forward pair of foot members, said means secured to and depending from the forward chassis extension member, and so constructed and arranged as to support said chassis extension member on said pair of foot members;
   a rearward pair of foot members arranged under the rearward chassis extension member and depending below the base portion of the chassis frame;
   power-driven means to alternately lift, advance, lower and return said rearward pair of foot members, said means fixed to and depending from the rearward chassis extension member, and so constructed and arranged as to support said chassis extension member on said pair of foot members;
   one of said power-driven means so constructed and arranged in connection with the chassis extension member from which it depends as to be steerable relative to same;
   means to steer said steerable power-driven means, said means to steer so constructed and arranged as to provide a steering control device located at a position convenient to a passenger carried on the base portion of the chassis frame, and including power transmission elements to connect said steering control device with the steerable means to alternately lift, advance, lower and return the foot members;

linkage connecting together the forward-located power-driven means and the rearward-located power-driven means to alternately lift, advance, lower and return, respectively, the forward and rearward pairs of foot members; said linkage so constructed and arranged that the lifting, advancing, lowering and returning movements of one of said means is transmitted to the other; one of said means so adjusted in connection with said linkage that diagonally opposite foot members are held at a similar phase of the stepping cycle;

a body shell simulating the torso of a figure, secured to and covering said chassis frame; said body shell so constructed and arranged as to provide a passenger compartment carried on the base portion of the chassis frame and openings to allow the foot members to depend to the ground.

2. A walking-figure amusement land vehicle comprising:

a chassis frame comprising a base portion, a first upright portion secured at a forward end of said base portion, a second upright portion secured at a rearward end of said base portion, a forward chassis extension member secured to said first upright portion, and a rearward chassis extension member secured to said second upright portion; said chassis extension members so arranged on their supporting upright portion as to effectively extend the overall length of said base portion, and attached on the upright portion at an elevation relative to said base portion;

a forward pair of foot members under the forward chassis extension member and depending below the base portion of the chassis frame;

power-driven means to alternately lift, advance, lower and return said forward pair of foot members, said means secured to and depending from the forward chassis extension member, and so constructed and arranged as to support said chassis extension member on said pair of foot members;

a rearward pair of foot members arranged under the rearward chassis extension member and depending below the base portion of the chassis frame;

power-driven means to alternately lift, advance, lower and return said rearward pair of foot members, said means fixed to and depending from the rearward chassis extension member, and so constructed and arranged as to support said chassis extension member on said pair of foot members;

one of said power-driven means so constructed and arranged in connection with the chassis extension member from which it depends as to be steerable relative to same;

means to steer the steerable means, said means to steer so constructed and arranged as to provide a steering control device located at a position convenient to a passenger carried on the base portion of the chassis frame, and including power transmission elements to connect said steering control device with the steerable means to alternately lift, advance, lower and return the foot members;

means to steady the base portion of the chassis frame during the lifted phase of the foot members' stepping cycle, said means arranged secured to said base portion and so constructed as to permit travel of the chassis frame in cooperation with the stepping movements of the foot members;

a body shell simulating the torso of a figure, secured to and covering said chassis frame; said body shell so constructed and arranged as to provide a passenger compartment carried on the base portion of the chassis frame and openings to allow the foot members to depend to the ground.

3. A walking-figure amusement land vehicle comprising:

a chassis frame comprising a base portion, a first upright portion secured at a forward end of said base portion, a second upright portion secured at a rearward end of said base portion, a forward chassis extension member secured to said first upright portion, and a rearward chassis extension member secured to said second upright portion; said chassis extension members so arranged on their supporting upright portion as to effectively extend the overall length of said base portion, and attached on the upright portion at an elevation relative to said base portion;

a forward single pair of foot members arranged under the forward chassis extension member and depending below the base portion of the chassis frame;

steerable means to alternately lift, advance, lower and return said foot members, said steerable means secured to and depending from the forward chassis extension member, and so constructed and arranged as to support said chassis extension member on said pair of foot members;

means to steer the said steerable means, said means to steer so constructed and arranged as to provide a steering control device located at a position convenient to a passenger carried on the base portion of the chassis frame, and including power transmission elements to connect said steering control device with the said steerable means;

a rearward single pair of foot members arranged under the rearward chassis extension member and depending below the base portion of the chassis frame;

non-steerable means to alternately lift, advance, lower and return said rearward pair of foot members, said means arranged fixed to and depending from the rearward chassis extension member, and so constructed and arranged as to support said chassis extension member on said pair of foot members;

linkage connecting together the forward-located steerable means and the rearward-located non-steerable means to alternately lift, advance, lower and return, respectively, the forward and rearward pairs of foot members; said linkage so constructed and arranged that power can be applied to same, and when power is applied to same, said linkage can simultaneously drive both said means; one of said means so adjusted in connection with said linkage that diagonally opposite foot members are held at a similar phase of the stepping cycle;

a motor secured to the base portion of the chassis frame, and power transmission means connecting said motor to said linkage;

a body shell simulating the torso of a figure, secured to and covering said chassis frame; said body shell so constructed and arranged as to provide a passenger compartment carried on the base portion of the chassis frame and openings to allow the foot members to depend to the ground.

4. A combination as recited in claim 3, wherein:

each chassis extension member is pivotally connected to its supporting upright portion in such manner that the opposite extremity of the chassis extension member is restricted to movement in an arc which stands in an upright plane and has its center at the point of pivotal connection with the supporting upright portion;

spring tension means is so arranged as to maintain said chassis extension members normally in an attitude paralleling the base portion of the chassis frame;

and said spring tension means is resistive enough to prevent the unloaded base portion from bottoming on the ground when the chassis frame is transported on said foot members, and yielding enough, when the said base portion is loaded to capacity with passengers, to permit the movable extremity of an affected chassis extension member to lift when one of its depending foot members steps on a sudden rise in the terrain.

5. A combination as recited in claim 3, wherein:

means are provided to steady the base portion of the chassis frame during the lifted phase of the foot members, said means secured to said base portion and so constructed as to permit travel of the chassis frame in cooperation with the stepping movements of the foot members;

each chassis extension member is pivotally connected to its supporting upright portion in such manner that the opposite extremity of the chassis extension member is restricted to movement in an arc which stands in an upright plane and has its center at the point of pivotal connection with the supporting upright portion;

and spring tension means is provided to influence the described extremity of each chassis extension member in a downward direction in said arc, said spring tension means resistive enough to insure the foot members, depending from said chassis extension member, traction with the ground, and yielding enough to permit the movable extremity of an affected chassis extension member to lift when one of its depending foot members steps on a sudden rise in the terrain.

6. A walking-figure amusement land vehicle comprising:

a chassis frame comprising a base portion, a first upright portion secured at a forward end of said base portion, a second upright portion secured at a rearward end of said base portion, a forward chassis extension member secured to said first upright portion, and a rearward chassis extension member secured to said second upright portion; said chassis extension members so arranged on their supporting upright portion as to effectively extend the overall length of said base portion, and attached on the upright portion at an elevation relative to said base portion;

a forward pair of foot members arranged under the forward chassis extension member and depending below the base portion of the chassis frame;

non-steerable means to alternately lift, advance, lower and return the forward pair of foot members, said means fixed to and depending from the forward chassis extension member, and so constructed and arranged as to support said chassis extension member on said pair of foot members;

a rearward pair of foot members arranged under the rearward chassis extension member and depending below the base portion of the chassis frame;

non-steerable means to alternately lift, advance, lower and return the rearward pair of foot members, said means fixed to and depending from the rearward chassis extension member, and so constructed and arranged as to support said chassis extension member on said foot members;

linkage connecting together the forward-located non-steerable means and the rearward-located non-steerable means to alternately lift, advance, lower and return, respectively, the forward and rearward pairs of foot members; said linkage so constructed and arranged that power can be applied to same, and when power is applied to same, said linkage can simultaneously drive both said means; one of said means so adjusted in connection with said linkage that diagonally opposite foot members are held at a similar phase of the stepping cycle; said linkage so constructed and arranged that the forward and rearward pairs of foot members can be caused to step in opposite directions, as well as in the same direction;

a motor and power transmission means connected to drive said linkage;

said power transmission means so constructed and arranged that, at the option of a passenger, said linkage can be driven in such manner that: the forward pair of foot members steps forwardly while the rearward pair steps rearwardly, to cause the chassis frame to pivot in one direction around a vertical axis; and, the forward pair of foot members steps rearwardly while the rearward pair steps forwardly, to cause the chassis frame to pivot in the opposite direction; and, both pairs of foot members step forwardly at the same time, to cause the chassis frame to advance in a straight path; and, both pairs of foot members step rearwardly at the same time, to cause the chassis frame to retreat in a straight path;

a steering control device located at a position convenient to a passenger carried on the base portion of the chassis frame; said steering control device connected to operate said power transmission means in such manner that any of the recited stepping effects can be selected in sequence, so that by the timely switching from one stepping condition to another, the direction of travel of the vehicle is controlled;

a body shell simulating the torso of a figure, secured to and covering said chassis frame; said body shell so constructed and arranged as to provide a passenger compartment carried on the base portion of the chassis frame and openings to allow the foot members to depend to the ground.

7. A combination as recited in claim 6, wherein:

means are provided to steady the base portion of the chassis frame during the lifted phase of the foot members, said means secured to said base portion and so constructed as to permit travel of the chassis frame in cooperation with the stepping movements of the foot members;

each chassis extension member is pivotally connected to its supporting upright portion in such manner that the opposite extremity of the chassis extension member is restricted to movement in an arc which stands in an upright plane and has its center at the point of pivotal connection with the supporting upright portion;

and spring tension means is provided to influence the described extremity of each chassis extension member in a downward direction in said arc, said spring tension means resistive enough to insure the foot members, depending from said chassis extension member, traction with the ground, and yielding enough to permit the movable extremity of an affected chassis extension member to lift when one of its depending foot members steps on a sudden rise in the terrain.

8. A chassis frame comprising a base portion, a first upright portion secured at a forward end of said base portion, a second upright portion secured at a rearward end of said base portion, a forward chassis extension member secured to said first upright portion, and a rearward chassis extension member secured to said second upright portion; said chassis extension members so arranged on their supporting upright portion as to effectively extend the overall length of said base portion, and attached on the upright portion at an elevation relative to said base portion;

each chassis extension member supported by movable foot members depending below the base portion and each said extension member pivotally connected to its supporting upright portion in such manner that the opposite extremity of the chassis extension member is restricted to movement in an arc which stands in an upright plane and has its center at the point of pivotal connection with the supporting upright portion;

spring tension means so arranged as to maintain said chassis extension members normally in an attitude paralleling the base portion of the chassis frame;

said spring tension means resistive enough to prevent the unloaded base portion from bottoming on the ground when the chassis frame is transported on said foot members, and yielding enough, when the said base portion is loaded to capacity with passengers, to permit the movable extremity of an affected chassis extension member to lift when one of its depending foot members steps on a sudden rise in the terrain.

9. A foot member for use in a stepper of the type where a support having a level underside lying in a horizontal plane is provided and disposed spaced above a horizontal reference surface, where said support is constructed suitable for attachment as an undercarriage of a vehicle, where means are provided, fixed to and depending from the underside of said support, to lift, advance, lower and return, which movements constitute the phases of a stepping cycle, a single horizontally disposed shaft which is journaled in a foot member; said foot member comprising:

a hollow open top box having a base, walls fixed to and completely encircling said base, a bearing located in said box, and yielding means to support said bearing at an altitude above said base;

said bearing so arranged relative to said base that the longitudinal axis of a journal aperture in the bearing lies parallel to said horizontal reference surface when the base is placed on same, said base will hang in balanced dependence from said shaft when the shaft is arranged journaled in the bearing, and the altitude of said longitudinal axis above said reference surface does not exceed the length of said base as measured in a plane that is intersected perpendicularly by said longitudinal axis;

said longitudinal axis extended in one direction to intersect a wall of the box, said wall provided with a cutout that is centered around said longitudinal axis; said cutout drawn large enough to remove a portion of the top edge of said wall, and so planned as to provide operating clearance when the shaft is arranged journaled in said bearing, between the remaining portion of said wall and the means to lift, advance, lower and return said shaft, throughout each phase of the stepping cycle, the open top of said box serving to permit said last mentioned means to depend into the box from the underside of said support;

said box proportioned large enough to encompass said last-mentioned means with sufficient additional clearance between the interior surface of the base and walls of the box and all parts of said means, as to permit the movement of the box relative to the comparatively fixed position of said means throughout each phase of the stepping cycle;

said bearing so positioned along its longitudinal axis as to cooperate with said cutout and the open top feature of the box in permitting some portion of said means to depend into and be arranged inside the box and be arranged with said horizontally disposed shaft journaled in said bearing;

said yielding means to support said bearing at an altitude above said base so constructed and arranged that as said shaft moves into the lowering phase of the stepping cycle, thereby placing a greater load upon said bearing, said bearing will gradually decrease in altitude in a manner meeting with increasing resistance from said yielding means as the altitude decreases; said yielding means so constructed and arranged as to prevent movement of said bearing in any direction other than vertically.

References Cited in the file of this patent
UNITED STATES PATENTS

| | | |
|---|---|---|
| D. 156,023 | Mitchell | Nov. 15, 1949 |
| 797,301 | Magie | Aug. 15, 1905 |
| 880,526 | Hele-Shaw | Mar. 6, 1908 |
| 1,382,854 | Rasmussen | June 28, 1921 |
| 2,918,738 | Barr | Dec. 29, 1959 |

FOREIGN PATENTS

| | | |
|---|---|---|
| 423,063 | Germany | Dec. 18, 1925 |